(12) United States Patent
Sugiura et al.

(10) Patent No.: US 10,141,592 B2
(45) Date of Patent: Nov. 27, 2018

(54) RESIN-FRAMED MEMBRANE ELECTRODE ASSEMBLY FOR FUEL CELL

(71) Applicant: HONDA MOTOR CO., LTD., Tokyo (JP)

(72) Inventors: Seiji Sugiura, Wako (JP); Yoshihito Kimura, Wako (JP); Naoki Mitsuta, Wako (JP); Masashi Sugishita, Wako (JP); Kenichi Tanaka, Wako (JP); Yukihito Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 569 days.

(21) Appl. No.: 14/507,834

(22) Filed: Oct. 7, 2014

(65) Prior Publication Data

US 2015/0099208 A1 Apr. 9, 2015

(30) Foreign Application Priority Data

Oct. 9, 2013 (JP) .................................. 2013-212113

(51) Int. Cl.
*H01M 4/86* (2006.01)
*H01M 8/1004* (2016.01)
(Continued)

(52) U.S. Cl.
CPC ....... *H01M 8/1004* (2013.01); *H01M 4/8626* (2013.01); *H01M 8/023* (2013.01);
(Continued)

(58) Field of Classification Search
CPC ............. H01M 8/0271; H01M 8/0273; H01M 8/0276; H01M 8/0997; H01M 8/0297;
(Continued)

(56) References Cited

U.S. PATENT DOCUMENTS

| 7,993,499 | B2 * | 8/2011 | Zuber ....................... C25B 9/10 204/252 |
| 2002/0197519 | A1 * | 12/2002 | Einhart ............... H01M 8/0247 429/435 |
| 2005/0014056 | A1 * | 1/2005 | Zuber ....................... C25B 9/10 429/456 |
| 2005/0084736 | A1 * | 4/2005 | Chang ................. H01M 8/0276 429/429 |

(Continued)

FOREIGN PATENT DOCUMENTS

| JP | 5194346 B2 | 3/2007 |
| JP | 2008-041337 | 2/2008 |

(Continued)

OTHER PUBLICATIONS

Japanese Office Action for corresponding JP Application No. 2013-212113, dated Sep. 27, 2016 (w/ English machine translation).

*Primary Examiner* — Milton I Cano
*Assistant Examiner* — Philip A. Stuckey
(74) *Attorney, Agent, or Firm* — Mori & Ward, LLP

(57) ABSTRACT

A resin-framed membrane electrode assembly for a fuel cell includes a stepped membrane electrode assembly and a resin frame member. The stepped membrane electrode assembly includes a solid polymer electrolyte membrane, an anode electrode, and a cathode electrode. The resin frame member surrounds an outer periphery of the solid polymer electrolyte membrane and includes an inner protruding portion that protrudes from an inner peripheral base portion toward the cathode electrode and that has a thickness. The inner protruding portion has an adhesive application portion to which an adhesive is applied so as to surround a part of the inner protruding portion. The part is in contact with the stepped membrane electrode assembly. A thickness of a cathode diffusion layer is larger than a thickness of an anode diffusion layer.

21 Claims, 8 Drawing Sheets

(51) Int. Cl.
| | |
|---|---|
| *H01M 8/0273* | (2016.01) |
| *H01M 8/023* | (2016.01) |
| *H01M 8/0247* | (2016.01) |
| *H01M 8/0297* | (2016.01) |
| *H01M 8/1018* | (2016.01) |
| *H01M 8/0234* | (2016.01) |
| *H01M 8/0258* | (2016.01) |
| *H01M 8/0267* | (2016.01) |

(52) U.S. Cl.
CPC ....... *H01M 8/0247* (2013.01); *H01M 8/0273* (2013.01); *H01M 8/0297* (2013.01); *H01M 8/0234* (2013.01); *H01M 8/0258* (2013.01); *H01M 8/0267* (2013.01); *H01M 2008/1095* (2013.01)

(58) Field of Classification Search
CPC .. H01M 8/1004; H01M 8/0247; H01M 8/023; H01M 4/8626; H01M 8/0267; H01M 8/0258; H01M 8/0234; H01M 2008/1095
See application file for complete search history.

(56) References Cited

U.S. PATENT DOCUMENTS

| | | | |
|---|---|---|---|
| 2005/0221145 A1* | 10/2005 | Leonida | H01M 2/08 429/510 |
| 2011/0136038 A1* | 6/2011 | Ishida | H01M 8/0273 429/480 |
| 2013/0177832 A1* | 7/2013 | Tsubosaka | H01M 8/0271 429/480 |
| 2013/0183604 A1* | 7/2013 | Tanaka | H01M 8/0289 429/480 |

FOREIGN PATENT DOCUMENTS

| | | |
|---|---|---|
| JP | 2008-053064 | 3/2008 |
| JP | 2009-129599 | 6/2009 |
| JP | 2010-257767 | 11/2010 |
| JP | 2013-098155 | 5/2013 |
| JP | 2013-131417 | 7/2013 |
| JP | 2013-145653 | 7/2013 |
| JP | 2013-168353 | 8/2013 |
| JP | 2014-011125 | 1/2014 |
| JP | 2014-017150 | 1/2014 |

* cited by examiner

BACKGROUND ART

RESIN-FRAMED MEMBRANE ELECTRODE ASSEMBLY FOR FUEL CELL

CROSS-REFERENCE TO RELATED APPLICATIONS

The present application claims priority under 35 U.S.C. § 119 to Japanese Patent Application No. 2013-212113, filed Oct. 9, 2013, entitled "Resin-Framed Membrane Electrode Assembly for Fuel Cell." The contents of this application are incorporated herein by reference in their entirety.

BACKGROUND

1. Field

The present disclosure relates to a resin-framed membrane electrode assembly for a fuel cell.

2. Description of the Related Art

In general, a solid polymer electrolyte fuel cell includes a solid polymer electrolyte membrane, which is made from a solid polymer ion-exchange membrane. The fuel cell includes a membrane electrode assembly (MEA) in which a solid polymer electrolyte membrane is sandwiched between an anode electrode and a cathode electrode. Each of the anode electrode and the cathode electrode includes a catalyst layer (electrode catalyst layer) and a gas diffusion layer (porous carbon). The fuel cell further includes separators (bipolar plates) sandwiching the membrane electrode assembly therebetween. A predetermined number of such fuel cells are stacked to form a fuel cell stack, which is used, for example, as an automobile fuel cell stack.

The term "stepped MEA" refers to a type of membrane electrode assembly in which one of the gas diffusion layers has a size in plan view smaller than that of the solid polymer electrolyte membrane and the other gas diffusion layer has a size in plan view the same as that of the solid polymer electrolyte membrane. A stepped MEA is usually structured as a resin-framed stepped MEA, which has a resin frame member. This is because, by using the resin frame member, it is possible to reduce the amount of a solid polymer electrolyte membrane, which is relatively expensive, and to protect the solid polymer electrolyte membrane, which is a thin and flimsy film.

For example, Japanese Unexamined Patent Application Publication No. 2008-41337 discloses a resin-framed membrane electrode assembly including a membrane electrode assembly 1 and a resin frame 2 as illustrated in FIG. 9. The membrane electrode assembly 1 includes a polymer electrolyte membrane 3. A first electrode layer 4a and a first gas diffusion layer 4b are disposed on one side of the electrolyte membrane 3. A second electrode layer 5a and a second gas diffusion layer 5b are disposed on the other side of the electrolyte membrane 3.

The entirety of the outer peripheral edge of the first gas diffusion layer 4b is located within the outer peripheral edge of the electrolyte membrane 3. The first electrode layer 4a is disposed on a surface of the electrolyte membrane 3 in such a way that there remains a surface region of the electrolyte membrane 3 between the outer peripheral edge of the first electrode layer 4a and the outer peripheral edge of the electrolyte membrane 3 around the entire periphery of the first electrode layer 4a. The second gas diffusion layer 5b extends to at least a part of a surface of the electrolyte membrane opposite to the surface region around the entire periphery of the electrolyte membrane 3. The resin frame 2 is fixed to at least a part of the surface region.

SUMMARY

According to one aspect of the present invention, a resin-framed membrane electrode assembly for a fuel cell includes a stepped membrane electrode assembly and a resin frame member. The stepped membrane electrode assembly includes a solid polymer electrolyte membrane, an anode electrode, and a cathode electrode. The anode electrode is disposed on one of surfaces of the solid polymer electrolyte membrane. The anode electrode includes an anode catalyst layer and an anode diffusion layer. The cathode electrode is disposed on the other surface of the solid polymer electrolyte membrane. The cathode electrode includes a cathode catalyst layer and a cathode diffusion layer. The cathode electrode has a size in plan view that is smaller than that of the anode electrode. The resin frame member surrounds an outer periphery of the solid polymer electrolyte membrane and includes an inner protruding portion that protrudes from an inner peripheral base portion toward the cathode electrode and that has a small thickness. The inner protruding portion is provided with an adhesive application portion formed from an adhesive that is applied so as to surround a part of the inner protruding portion. The part is in contact with the membrane electrode assembly. A thickness of the cathode diffusion layer is larger than a thickness of the anode diffusion layer. The thickness of the inner protruding portion of the resin frame member is larger than the thickness of the cathode diffusion layer.

According to another aspect of the present invention, a resin-framed membrane electrode assembly for a fuel cell includes a stepped membrane electrode assembly and a resin frame member. The stepped membrane electrode assembly includes a solid polymer electrolyte membrane, an anode electrode, and a cathode electrode. The solid polymer electrolyte membrane has a first surface and a second surface opposite to the first surface. The anode electrode is disposed on the first surface of the solid polymer electrolyte membrane and includes an anode catalyst layer and an anode diffusion layer. The cathode electrode is disposed on the second surface of the solid polymer electrolyte membrane and includes a cathode catalyst layer and a cathode diffusion layer. The cathode electrode has a size in plan view that is smaller than a size in plan view of the anode electrode. The resin frame member surrounds an outer periphery of the solid polymer electrolyte membrane and includes an inner protruding portion that protrudes from an inner peripheral base portion toward the cathode electrode and that has a thickness. The inner protruding portion has an adhesive application portion to which an adhesive is applied so as to surround a part of the inner protruding portion. The part is in contact with the stepped membrane electrode assembly. A thickness of the cathode diffusion layer is larger than a thickness of the anode diffusion layer. The thickness of the inner protruding portion of the resin frame member is larger than the thickness of the cathode diffusion layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
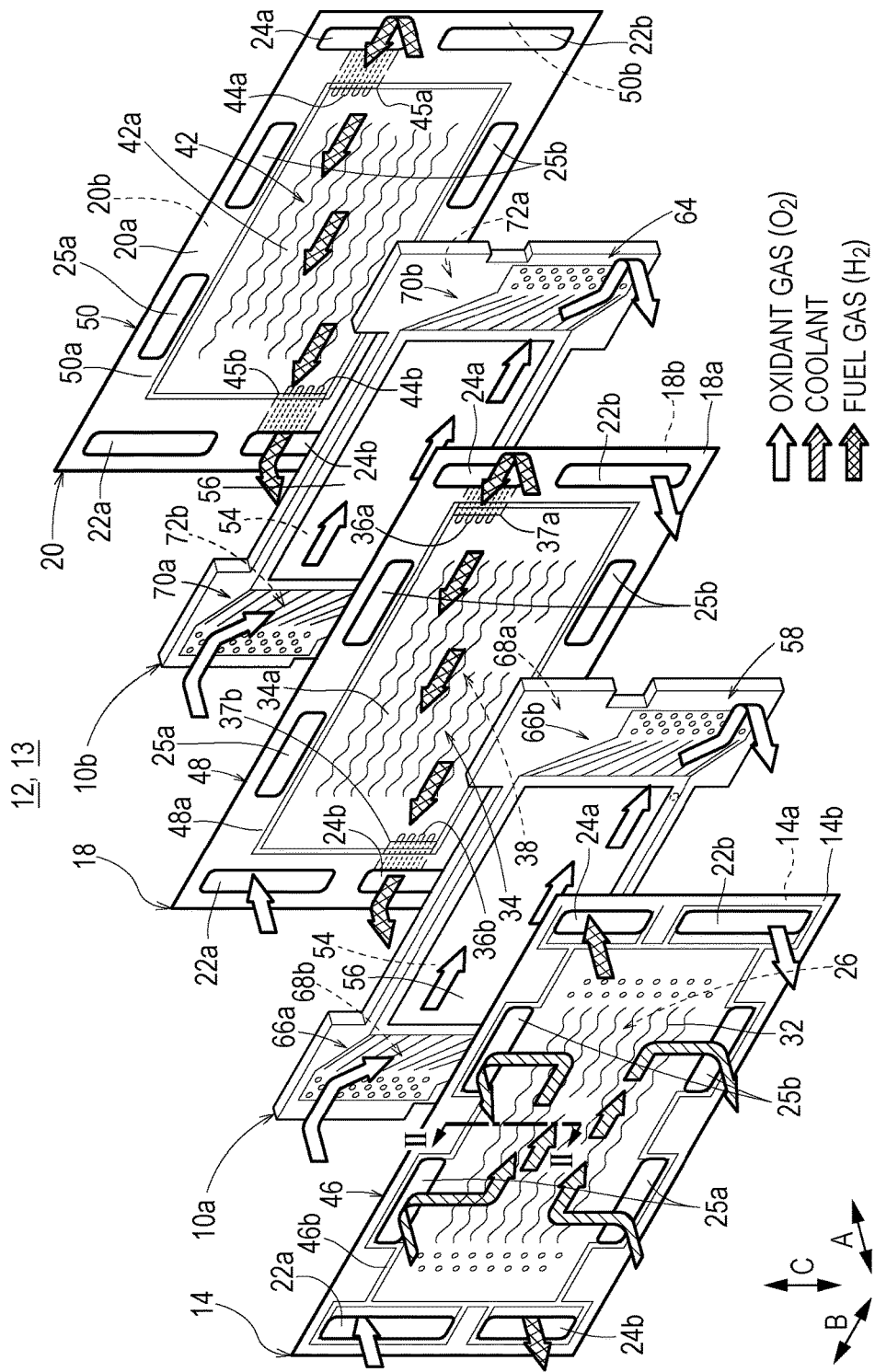
FIG. 1 is an exploded perspective view of a fuel cell including first and second resin-framed membrane electrode assemblies according to an embodiment of the present disclosure.

The embodiments will now be described with reference to the accompanying drawings, wherein like reference numerals designate corresponding or identical elements throughout the various drawings.

Figure 2:
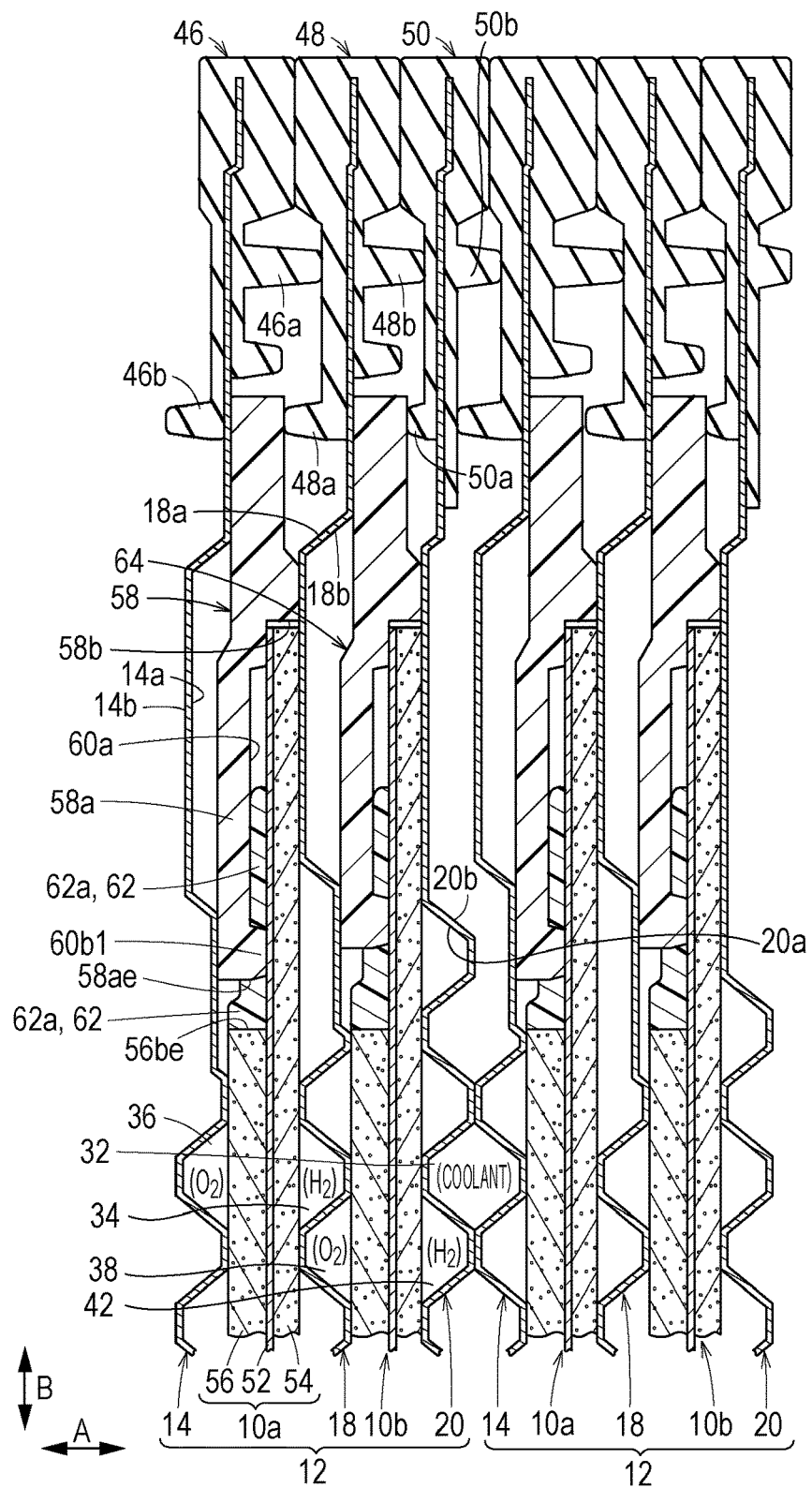
FIG. 2 is a sectional view of the fuel cell taken along line II-II of FIG. 1.

As illustrated in FIGS. 1 and 2, a first resin-framed membrane electrode assembly 10a and a second resin-framed membrane electrode assembly 10b according to an embodiment of the present disclosure are included in a solid polymer electrolyte fuel cell 12, which has a horizontally elongated (or a vertically elongated) rectangular shape. A plurality of fuel cells 12 are stacked, for example, in the direction of arrow A (horizontal direction) or in the direction of arrow C (direction of gravity) to form a fuel cell stack 13. The fuel cell stack 13 is mounted, for example, in a fuel cell automobile (not shown).

The fuel cell 12 includes a first metal separator 14, the first resin-framed membrane electrode assembly (resin-framed MEA) 10a, a second metal separator 18, the second resin-framed membrane electrode assembly (resin-framed MEA) 10b, and a third metal separator 20.

Each of the first metal separator 14, the second metal separator 18, and the third metal separator 20 is, for example, a steel plate, a stainless steel plate, an aluminum plate, or a galvanized steel plate. Each of the first metal separator 14, the second metal separator 18, and the third metal separator 20 is made by press-forming a thin metal plate so as to have a rectangular shape in plan view and a corrugated cross section. Carbon separators, for example, may be used instead of the first metal separator 14, the second metal separator 18, and the third metal separator 20.

As illustrated in FIG. 1, an oxidant gas inlet manifold 22a and a fuel gas outlet manifold 24b are formed in the fuel cell 12 so as to extend in the direction of arrow A through one end portion of the fuel cell 12 in the longitudinal direction (the direction of arrow B). To be specific, the oxidant gas inlet manifold 22a and the fuel gas outlet manifold 24b are formed in one end portion of each of the first metal separator 14, the second metal separator 18, and the third metal separator 20 in the longitudinal direction. An oxidant gas, such as an oxygen-containing gas, is supplied through the oxidant gas inlet manifold 22a. A fuel gas, such as a hydrogen-containing gas, is discharged through the fuel gas outlet manifold 24b.

A fuel gas inlet manifold 24a and an oxidant gas outlet manifold 22b are formed in the fuel cell 12 so as to extend in the direction of arrow A through the other end portion of the fuel cell 12 in the longitudinal direction (the direction of arrow B). The fuel gas is supplied through the fuel gas inlet manifold 24a. The oxidant gas is discharged through the oxidant gas outlet manifold 22b.

A pair of coolant inlet manifolds 25a are formed in the fuel cell 12 so as to extend in the direction of arrow A through end portions of the fuel cell 12 in the transversal direction (the direction of arrow C), the end portions being near the oxidant gas inlet manifold 22a. A coolant is supplied through the coolant inlet manifolds 25a. A pair of coolant outlet manifolds 25b are formed in the fuel cell 12 through end portions of the fuel cell 12 in the transversal direction, the end portions being near the fuel gas inlet manifold 24a. The coolant is discharged through the coolant outlet manifolds 25b.

Figure 3:
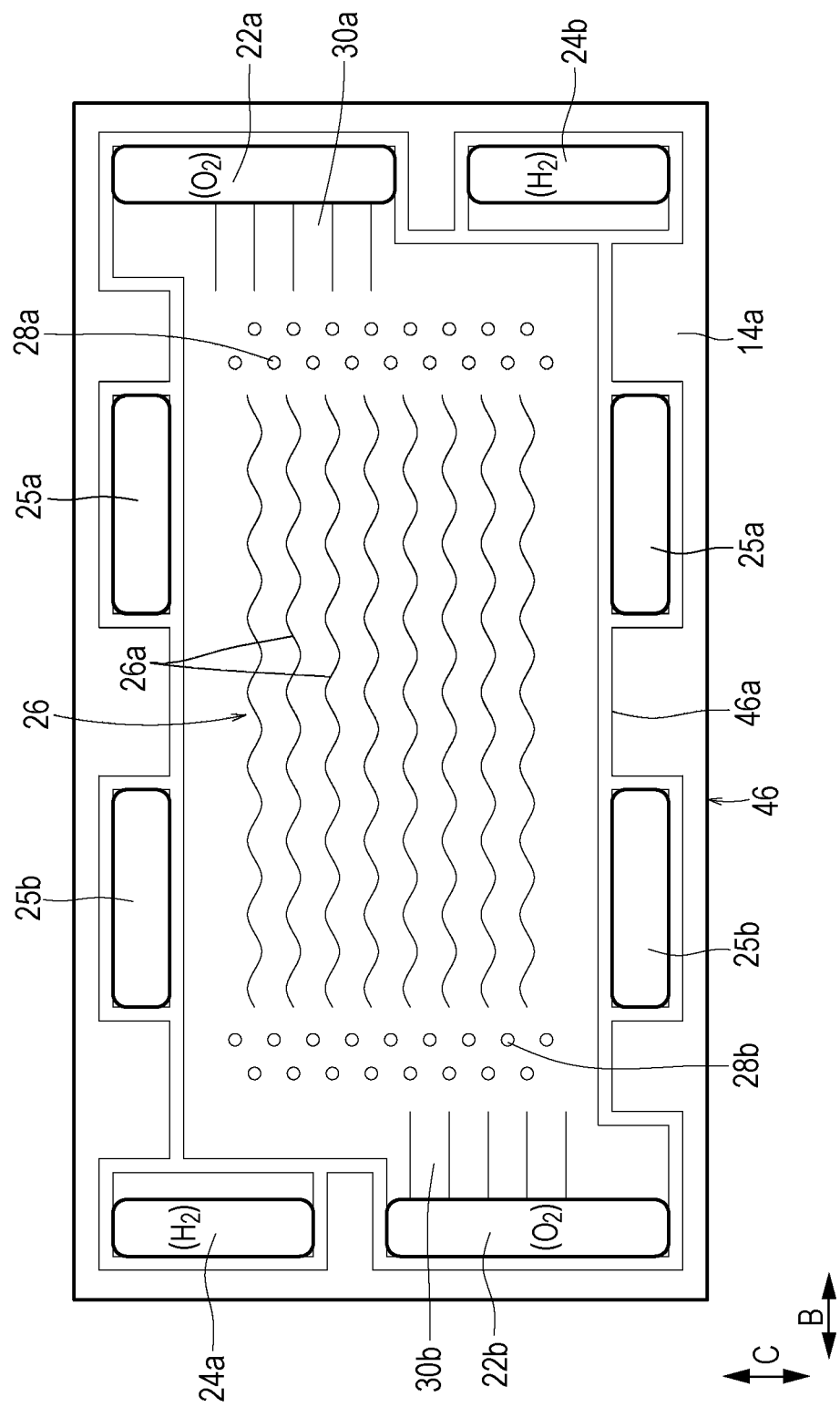
FIG. 3 is a plan view of a first metal separator of the fuel cell.

As illustrated in FIG. 3, a first oxidant gas channel 26, through which the oxidant gas inlet manifold 22a is connected to the oxidant gas outlet manifold 22b, is formed on a surface 14a of the first metal separator 14 facing the first resin-framed membrane electrode assembly 10a.

The first oxidant gas channel 26 includes a plurality of wave-shaped channel grooves (or linear channel grooves) 26a extending in the direction of arrow B. A plurality of inlet embossed portions 28a and a plurality of outlet embossed portions 28b are respectively formed near the inlet and the outlet of the first oxidant gas channel 26.

A plurality of inlet connection grooves 30a, which form a bridge portion, are formed between the inlet embossed portion 28a and the oxidant gas inlet manifold 22a. A plurality of outlet connection grooves 30b, which form a bridge portion, are formed between the outlet embossed portion 28b and the oxidant gas outlet manifold 22b.

As illustrated in FIG. 1, a part of a coolant channel 32, through which the pair of coolant inlet manifolds 25a are connected to the pair of coolant outlet manifolds 25b, is formed on a surface 14b of the first metal separator 14.

A first fuel gas channel 34, through which the fuel gas inlet manifold 24a is connected to the fuel gas outlet manifold 24b, is formed on a surface 18a of the second metal separator 18 facing the first resin-framed membrane electrode assembly 10a. The first fuel gas channel 34 includes a plurality of wave-shaped channel grooves (or linear channel grooves) 34a extending in the direction of arrow B.

A plurality of supply channel grooves 36a, through which the fuel gas inlet manifold 24a is connected to the first fuel gas channel 34, are formed near the fuel gas inlet manifold 24a. The supply channel grooves 36a are covered by a cover member 37a, which is a bridge. A plurality of discharge channel grooves 36b, through which the first fuel gas channel 34 is connected to the fuel gas outlet manifold 24b, are formed near the fuel gas outlet manifold 24b. The discharge channel grooves 36b are covered by a cover member 37b, which is a bridge.

Figure 4:
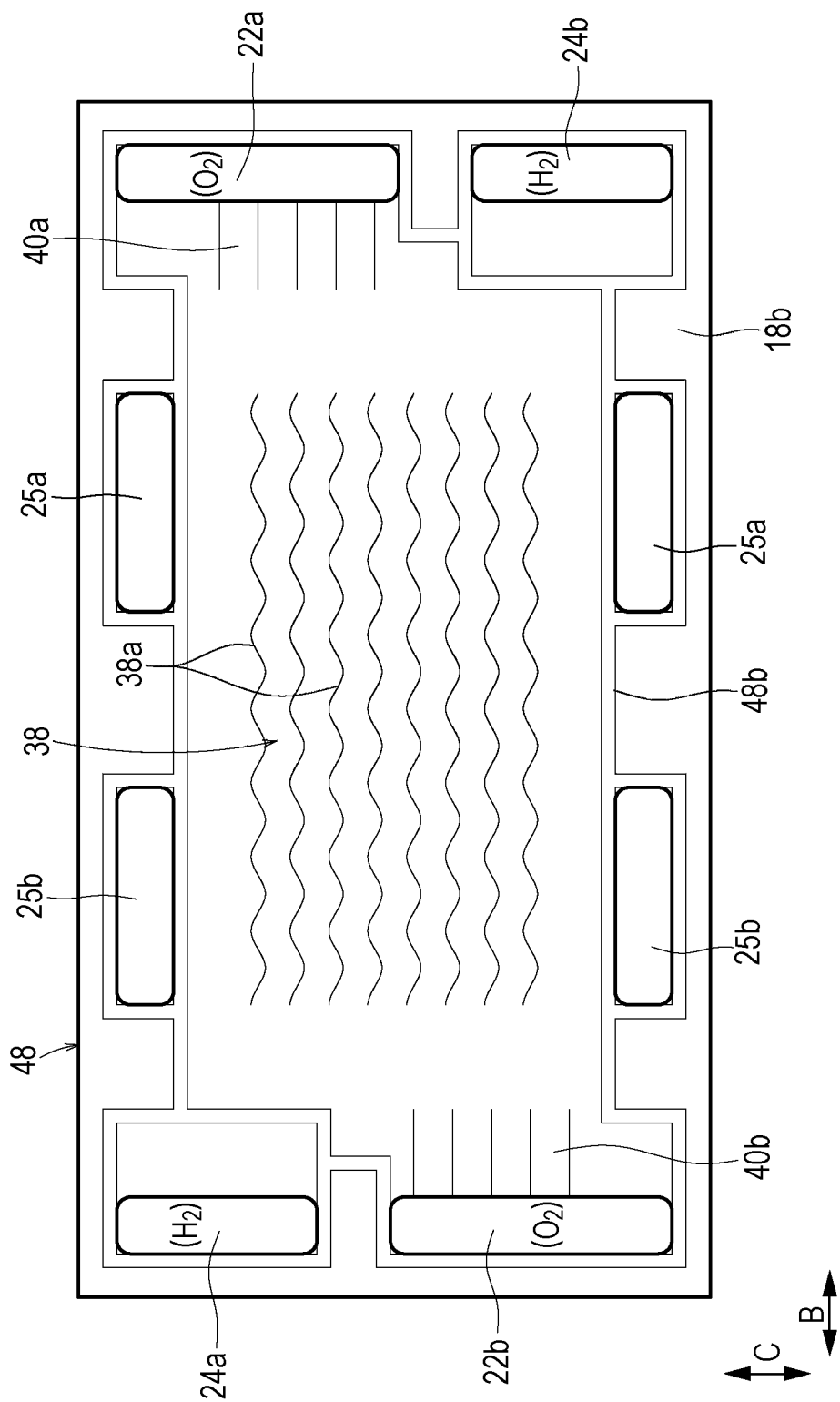
FIG. 4 is a plan view of a second metal separator of the fuel cell.

As illustrated in FIG. 4, a second oxidant gas channel 38, through which the oxidant gas inlet manifold 22a is connected to the oxidant gas outlet manifold 22b, is formed on a surface 18b of the second metal separator 18 facing the second resin-framed membrane electrode assembly 10b. The second oxidant gas channel 38 includes a plurality of wave-shaped channel grooves (or linear channel grooves) 38a extending in the direction of arrow B.

As illustrated in FIG. 1, a second fuel gas channel 42, through which the fuel gas inlet manifold 24a is connected to the fuel gas outlet manifold 24b, is formed on a surface 20a of the third metal separator 20 facing the second resin-framed membrane electrode assembly 10b. The second fuel gas channel 42 includes a plurality of wave-shaped channel grooves (or linear channel grooves) 42a extending in the direction of arrow B.

A plurality of supply channel grooves 44a, through which the fuel gas inlet manifold 24a is connected to the second fuel gas channel 42, are formed near the fuel gas inlet manifold 24a. The supply channel grooves 44a are covered by a cover member 45a, which is a bridge. A plurality of discharge channel grooves 44b, through which the second fuel gas channel 42 is connected to the fuel gas outlet manifold 24b, are formed near the fuel gas outlet manifold 24b. The discharge channel grooves 44b are covered by a cover member 45b, which is a bridge.

On a surface 20b of the third metal separator 20, a part of the coolant channel 32 is formed on the back side of the second fuel gas channel 42. The entirety of the coolant channel 32 is formed between the surface 20b of the third metal separator 20 and the surface 14b of the first metal separator 14 adjacent to the third metal separator 20.

A first sealing member 46 is integrally formed on the surfaces 14a and 14b of the first metal separator 14 so as to surround the outer peripheral end portion of the first metal separator 14. A second sealing member 48 is integrally formed on the surfaces 18a and 18b of the second metal separator 18 so as to surround the outer peripheral end portion of the second metal separator 18. A third sealing member 50 is integrally formed on the surfaces 20a and 20b of the third metal separator 20 so as to surround the outer peripheral end portion of the third metal separator 20.

Each of the first sealing member 46, the second sealing member 48, and the third sealing member 50 is made of an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

As illustrated in FIG. 3, the first sealing member 46 includes a first projecting sealing portion 46a on the surface 14a of the first metal separator 14. The first projecting sealing portion 46a surrounds the oxidant gas inlet manifold 22a, the oxidant gas outlet manifold 22b, and the first oxidant gas channel 26. As illustrated in FIG. 2, the first projecting sealing portion 46a is in contact with the second sealing member 48 of the second metal separator 18, which is stacked on the first metal separator 14 with the first resin-framed membrane electrode assembly 10a therebetween.

As illustrated in FIG. 1, the first sealing member 46 includes a second projecting sealing portion 46b on the surface 14b of the first metal separator 14. The second projecting sealing portion 46b surrounds the coolant inlet manifolds 25a, the coolant outlet manifolds 25b, and the coolant channel 32.

The second sealing member 48 includes a first projecting sealing portion 48a on the surface 18a of the second metal separator 18. The first projecting sealing portion 48a surrounds the first fuel gas channel 34. As illustrated in FIG. 2, the first projecting sealing portion 48a is in contact with a first resin frame member 58 (described below) of the first resin-framed membrane electrode assembly 10a adjacent to the second metal separator 18.

As illustrated in FIG. 4, the second sealing member 48 includes a second projecting sealing portion 48b on the surface 18b of the second metal separator 18. The second projecting sealing portion 48b surrounds the oxidant gas inlet manifold 22a, the oxidant gas outlet manifold 22b, and the second oxidant gas channel 38. As illustrated in FIG. 2, the second projecting sealing portion 48b is in contact with the third sealing member 50 of the third metal separator 20, which is stacked on the second metal separator 18 with the second resin-framed membrane electrode assembly 10b therebetween.

As illustrated in FIG. 1, the third sealing member 50 includes a first projecting sealing portion 50a on the surface 20a of the third metal separator 20. The first projecting sealing portion 50a surrounds the second fuel gas channel 42. As illustrated in FIG. 2, the first projecting sealing portion 50a is in contact with a second resin frame member 64 (described below) of the second resin-framed membrane electrode assembly 10b adjacent to the third metal separator 20.

The third sealing member 50 includes a second projecting sealing portion 50b on the surface 20b of the third metal separator 20. The second projecting sealing portion 50b surrounds the coolant inlet manifolds 25a, the coolant outlet manifolds 25b, and the coolant channel 32.

Figure 5:
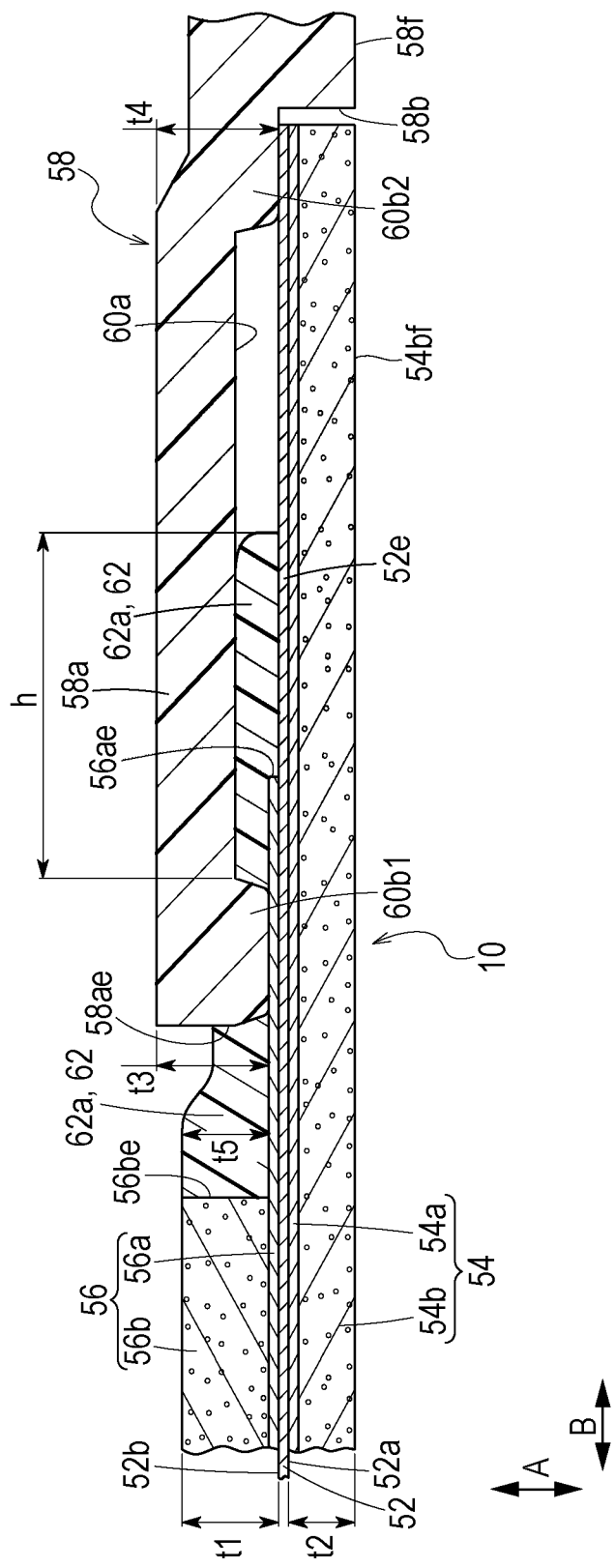
FIG. 5 is a partial sectional view of the first resin-framed membrane electrode assembly.

As illustrated in FIGS. 2 and 5, each of the first resin-framed membrane electrode assembly 10a and the second resin-framed membrane electrode assembly 10b includes a membrane electrode assembly 10. The membrane electrode assembly 10 includes a solid polymer electrolyte membrane 52 (cation-exchange membrane), and an anode electrode 54 and a cathode electrode 56 sandwiching the solid polymer electrolyte membrane 52 therebetween. The solid polymer electrolyte membrane 52 is, for example, a thin film that is made of perfluorosulfonic acid copolymers and soaked with water.

The solid polymer electrolyte membrane 52 may be made from a hydrocarbon (HC) electrolyte, instead of a fluoropolymer electrolyte. The cathode electrode 56 has a size in plan view smaller than that of each of the solid polymer electrolyte membrane 52 and the anode electrode 54.

As illustrated in FIG. 5, the anode electrode 54 includes an anode catalyst layer (electrode catalyst layer) 54a and an anode diffusion layer (gas diffusion layer) 54b. The anode catalyst layer 54a is joined to a surface 52a of the solid polymer electrolyte membrane 52. The anode diffusion layer 54b is stacked on the anode catalyst layer 54a. The outer sizes of the anode catalyst layer 54a and the anode diffusion layer 54b are the same as each other and are the same as (or smaller than) the outer size of the solid polymer electrolyte membrane 52.

The cathode electrode 56 includes a cathode catalyst layer (electrode catalyst layer) 56a and a cathode diffusion layer (gas diffusion layer) 56b. The cathode catalyst layer 56a is joined to a surface 52b of the solid polymer electrolyte membrane 52. The cathode diffusion layer 56b is stacked on the cathode catalyst layer 56a. An outer peripheral end portion 56ae of the cathode catalyst layer 56a projects further outward than an outer peripheral end portion 56be of the cathode diffusion layer 56b. The outer size of the cathode catalyst layer 56a is smaller than that of the solid polymer electrolyte membrane 52. The outer periphery of the cathode catalyst layer 56a is disposed in an adhesive application portion 62a (described below) and sealed with an adhesive 62.

Each of the anode catalyst layer 54a and the cathode catalyst layer 56a is formed by uniformly coating a surface of a corresponding one of the anode diffusion layer 54b and the cathode diffusion layer 56b with porous carbon particles whose surfaces support a platinum alloy.

Each of the anode diffusion layer 54*b* and the cathode diffusion layer 56*b* is made of carbon paper or the like. The size of the cathode diffusion layer 56*b* in plan view is smaller than that of the anode diffusion layer 54*b*. The thickness t1 of the cathode diffusion layer 56*b* is larger than the thickness t2 of the anode diffusion layer 54*b* (t1>t2). The anode catalyst layer 54*a* and the cathode catalyst layer 56*a* are formed on both sides of the solid polymer electrolyte membrane 52.

The first resin-framed membrane electrode assembly 10*a* includes the first resin frame member 58 that surrounds the outer periphery of the solid polymer electrolyte membrane 52 and that is joined to the anode electrode 54 and the cathode electrode 56. The first resin frame member 58 is made of, for example, polyphenylene sulfide (PPS), polyphthalamide (PPA), polyethylene naphthalate (PEN), polyethersulfone (PES), liquid-crystal polymer (LCP), polyvinylidene fluoride (PVDF), silicone rubber, fluorocarbon rubber, or ethylene propylene rubber (EPDM).

An inner protruding portion 58*a* is integrally formed with an inner peripheral base portion 58*b* of the first resin frame member 58. The inner protruding portion 58*a* has a small thickness and protrudes toward the outer periphery of the cathode electrode 56. The thickness t3 of the inner protruding portion 58*a* is larger than the thickness t1 of the cathode diffusion layer 56*b* (t3>t1).

The inner protruding portion 58*a* includes a surrounding recess 60*a* that surrounds a part of the inner protruding portion 58*a* that is in contact with the membrane electrode assembly 10. The adhesive application portion 62*a*, which is formed from the adhesive 62 applied thereto, is disposed in the surrounding recess 60*a*. The adhesive 62 is applied to only an inner peripheral part of the surrounding recess 60*a*, and a space is formed in an outer peripheral part of the surrounding recess 60*a*. The adhesive application portion 62*a* extends over a region h, and the outer peripheral end portion 56*ae* of the cathode catalyst layer 56*a* is located in the region h. For example, a liquid sealant or a hot-melt adhesive is used as the adhesive 62. The surrounding recess 60*a* is formed between an inner peripheral projection 60*b*1, which is located at the inner periphery of the inner protruding portion 58*a*, and an outer peripheral projection 60*b*2, which is located at the outer periphery of the inner protruding portion 58*a* (adjacent to the inner peripheral base portion 58*b*).

The thickness t4 of the outer peripheral projection 60*b*2 is larger than the thickness of the inner peripheral projection 60*b*1 by the thickness of the cathode catalyst layer 56*a*. The inner peripheral projection 60*b*1 is in contact with the cathode catalyst layer 56*a* projecting outward from the cathode diffusion layer 56*b* of the membrane electrode assembly 10. The outer peripheral projection 60*b*2 is in contact with the outermost periphery of the solid polymer electrolyte membrane 52 of the membrane electrode assembly 10.

The inner protruding portion 58*a* of the first resin frame member 58 and the membrane electrode assembly 10 are bonded to each other through the adhesive application portion 62*a*, which is a layer of the adhesive 62 applied to the surrounding recess 60*a*. The adhesive application portion 62*a* has a frame-like shape extending along the entire periphery of an outer peripheral edge portion 52*e* of the solid polymer electrolyte membrane 52. As illustrated in FIG. 5, a gap is formed between an inner peripheral end portion 58*ae* of the first resin frame member 58 and the outer peripheral end portion 56*be* of the cathode diffusion layer 56*b*. An adhesive application portion 62*a* having a thickness t5 is formed in the gap. The thickness t5 is smaller than or equal to the thickness t1 of the cathode diffusion layer 56*b*. Preferably, a part of the inner peripheral end portion 58*ae* that is in contact with the cathode catalyst layer 56*a* has a rounded corner. The inner peripheral base portion 58*b* of the first resin frame member 58 and the outer peripheral end portion of the anode diffusion layer 54*b* of the anode electrode 54 may be integrated with each other through resin impregnation by melting a part of the first resin frame member 58. A flat surface 54*bf* of the anode diffusion layer 54*b* is flush with a flat surface 58*f* of the first resin frame member 58 adjacent to the inner peripheral base portion 58*b*.

As illustrated in FIGS. 1 and 2, the second resin-framed membrane electrode assembly 10*b* includes a second resin frame member 64 that surrounds the outer periphery of the solid polymer electrolyte membrane 52 and that is joined to the anode electrode 54 and the cathode electrode 56. Detailed description of the second resin frame member 64 will be omitted, because it has the same structure as the first resin frame member 58.

As illustrated in FIG. 1, on a surface of the first resin frame member 58 on the cathode electrode 56 side, an inlet buffer portion 66*a* is disposed between the oxidant gas inlet manifold 22*a* and an inlet of the first oxidant gas channel 26. On the surface of the first resin frame member 58 on the cathode electrode 56 side, an outlet buffer portion 66*b* is disposed between the outlet of the first oxidant gas channel 26 and the oxidant gas outlet manifold 22*b*. Each of the inlet buffer portion 66*a* and the outlet buffer portion 66*b* has a plurality of linear projections and embossed portions. Alternatively, each of the buffer portions 66*a* and 66*b* may have only the embossed portions. Buffer portions described below each has a structure the same as above.

Figure 6:
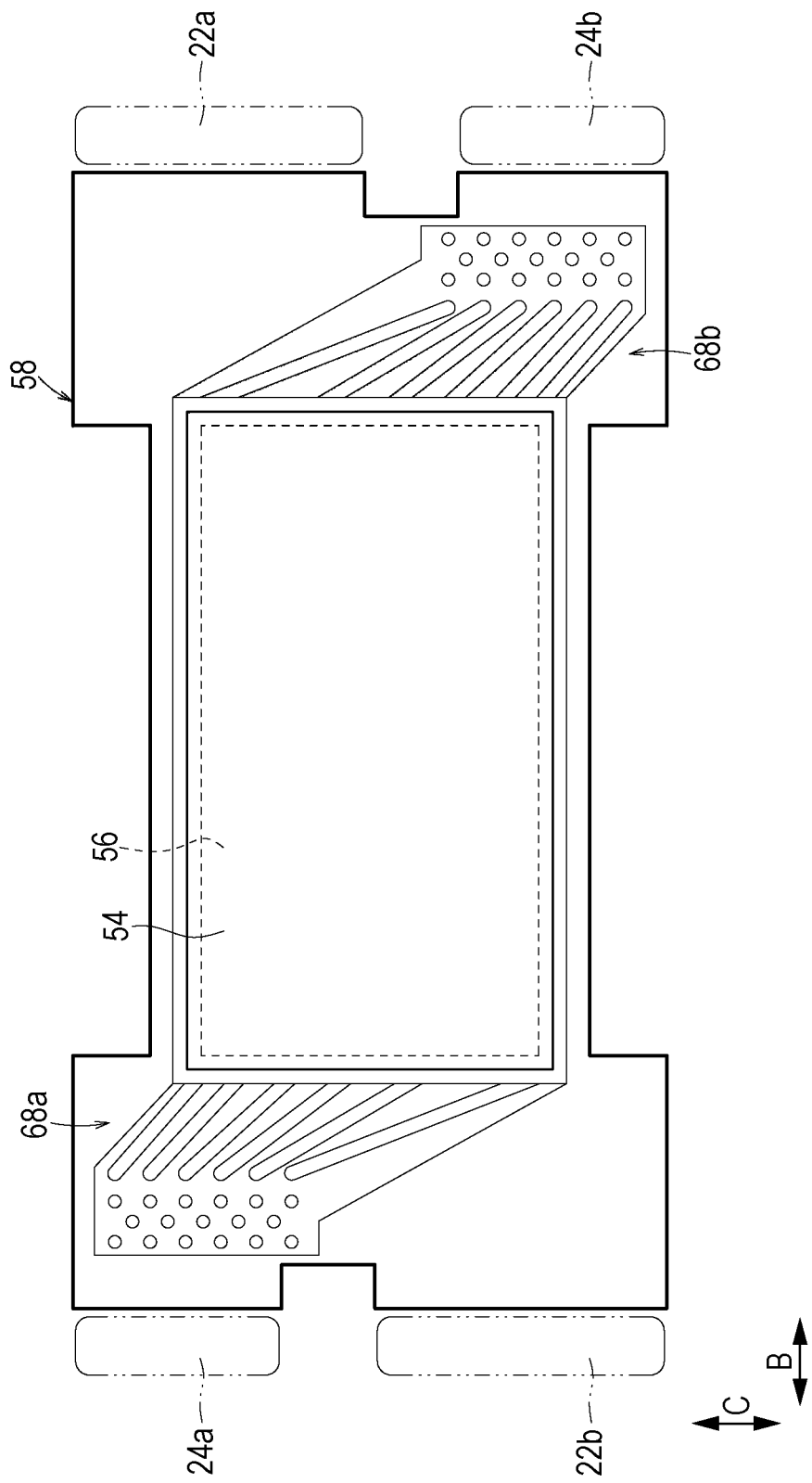
FIG. 6 is a plan view of the first resin-framed membrane electrode assembly.

As illustrated in FIG. 6, on a surface of the first resin frame member 58 on the anode electrode 54 side, an inlet buffer portion 68*a* is disposed between the fuel gas inlet manifold 24*a* and the first fuel gas channel 34. On the surface of the first resin frame member 58 on the anode electrode 54 side, an outlet buffer portion 68*b* is disposed between the first fuel gas channel 34 and the fuel gas outlet manifold 24*b*.

As illustrated in FIG. 1, on a surface of the second resin frame member 64 of the second resin-framed membrane electrode assembly 10*b* on the cathode electrode 56 side, an inlet buffer portion 70*a* is disposed between the oxidant gas inlet manifold 22*a* and the second oxidant gas channel 38. On the surface of the second resin frame member 64 on the cathode electrode 56 side, an outlet buffer portion 70*b* is disposed between the second oxidant gas channel 38 and the oxidant gas outlet manifold 22*b*.

Figure 7:
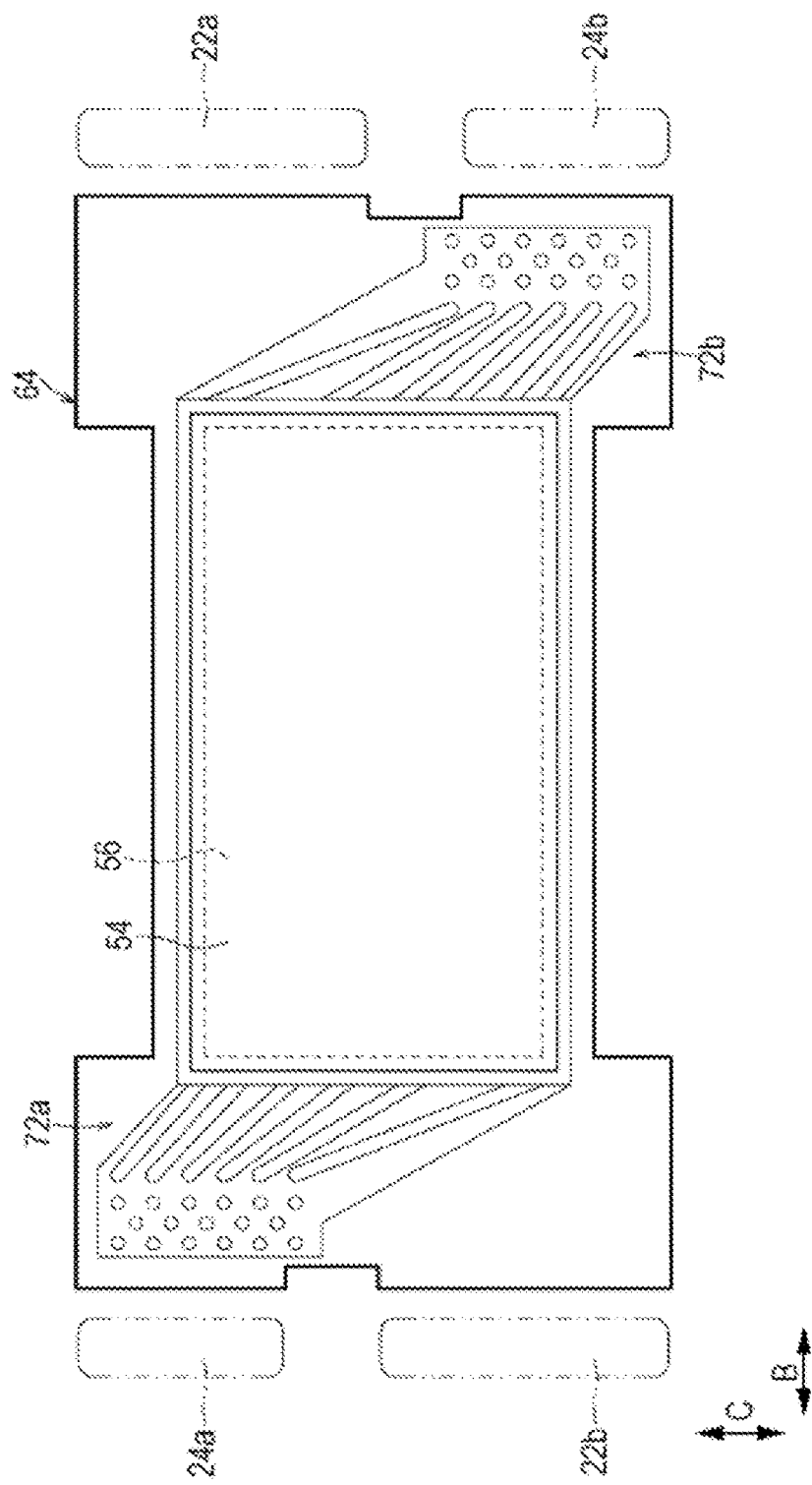
FIG. 7 is a plan view of the second resin-framed membrane electrode assembly.

As illustrated in FIG. 7, on a surface of the second resin frame member 64 on the anode electrode 54 side, an inlet buffer portion 72*a* is disposed between the fuel gas inlet manifold 24*a* and the second fuel gas channel 42. On the surface of the second resin frame member 64 on anode electrode 54 side, an outlet buffer portion 72*b* is disposed between the second fuel gas channel 42 and the fuel gas outlet manifold 24*b*.

When two fuel cells 12 are stacked on top of each other, the coolant channel 32 is formed between the first metal separator 14 of one of the fuel cells 12 and the third metal separator 20 of the other fuel cell 12.

The operation of the fuel cell 12 having the aforementioned structure will be described.

First, as illustrated in FIG. 1, an oxidant gas, such as an oxygen-containing gas, is supplied to the oxidant gas inlet manifold 22*a*. A fuel gas, such as a hydrogen-containing gas, is supplied to the fuel gas inlet manifold 24a. A coolant, such as pure water, ethylene glycol, or oil, is supplied to the pair of coolant inlet manifolds 25a.

A part of the oxidant gas flows from the oxidant gas inlet manifold 22a through the inlet buffer portion 66a and is supplied to the first oxidant gas channel 26 of the first metal separator 14. Another part of the oxidant gas flows through the inlet buffer portion 70a and is introduced into the second oxidant gas channel 38 of the second metal separator 18.

As illustrated in FIGS. 1, 3, and 4, the part of the oxidant gas flows along the first oxidant gas channel 26 in the direction of arrow B (horizontal direction) and is supplied to the cathode electrode 56 of the first resin-framed membrane electrode assembly 10a. The other part of the oxidant gas flows along the second oxidant gas channel 38 in the direction of arrow B and is supplied to the cathode electrode 56 of the second resin-framed membrane electrode assembly 10b.

As illustrated in FIG. 1, the fuel gas is supplied from the fuel gas inlet manifold 24a to the supply channel grooves 36a and 44a. In the supply channel grooves 36a, the fuel gas flows through the inlet buffer portion 68a and is supplied to the first fuel gas channel 34 of the second metal separator 18. In the supply channel grooves 44a, the fuel gas flows through the inlet buffer portion 72a and is supplied to the second fuel gas channel 42 of the third metal separator 20.

The fuel gas flows along the first fuel gas channel 34 in the direction of arrow B and is supplied to the anode electrode 54 of the first resin-framed membrane electrode assembly 10a. The fuel gas flows along the second fuel gas channel 42 in the direction of arrow B and is supplied to the anode electrode 54 of the second resin-framed membrane electrode assembly 10b.

Accordingly, in each of the first resin-framed membrane electrode assembly 10a and the second resin-framed membrane electrode assembly 10b, the oxidant gas supplied to the cathode electrode 56 and the fuel gas supplied to the anode electrode 54 are consumed in electrochemical reactions in the electrode catalyst layer, and therefore electric power is generated.

Next, the oxidant gas, which has been supplied to the cathode electrodes 56 of each of the first resin-framed membrane electrode assembly 10a and the second resin-framed membrane electrode assembly 10b and consumed, passes through a corresponding one of the outlet buffer portion 66b and 70b and is discharged to the oxidant gas outlet manifold 22b. The fuel gas, which has been supplied to the anode electrode 54 of each of the first resin-framed membrane electrode assembly 10a and the second resin-framed membrane electrode assembly 10b and consumed, flows through the outlet buffer portion 68b and 72b and is discharged to the fuel gas outlet manifold 24b.

As illustrated in FIG. 1, the coolant, which has been supplied to the pair of coolant inlet manifolds 25a on the left and right sides, is introduced into the coolant channel 32. The coolant flows from the coolant inlet manifolds 25a to the coolant channel 32, temporarily flows inward in the direction of arrow C, then flows in the direction of direction of arrow B, and cools the first resin-framed membrane electrode assembly 10a and the second resin-framed membrane electrode assembly 10b. The coolant flows in the direction of arrow C and is discharged to the pair of coolant outlet manifolds 25b.

As can be seen from FIGS. 2 and 5, in the first resin-framed membrane electrode assembly 10a according to the present embodiment, the size of the cathode electrode 56 in plan view is smaller than that of the anode electrode 54. The inner protruding portion 58a of the first resin frame member 58 is provided with the adhesive application portion 62a. The adhesive application portion 62a integrally bonds the outer peripheral edge portion 52e of the solid polymer electrolyte membrane 52 corresponding to the outer peripheral edge portion of the anode electrode 54. The thickness t2 of the anode diffusion layer 54b is smaller than the thickness t1 of the cathode diffusion layer 56b.

Figure 8:
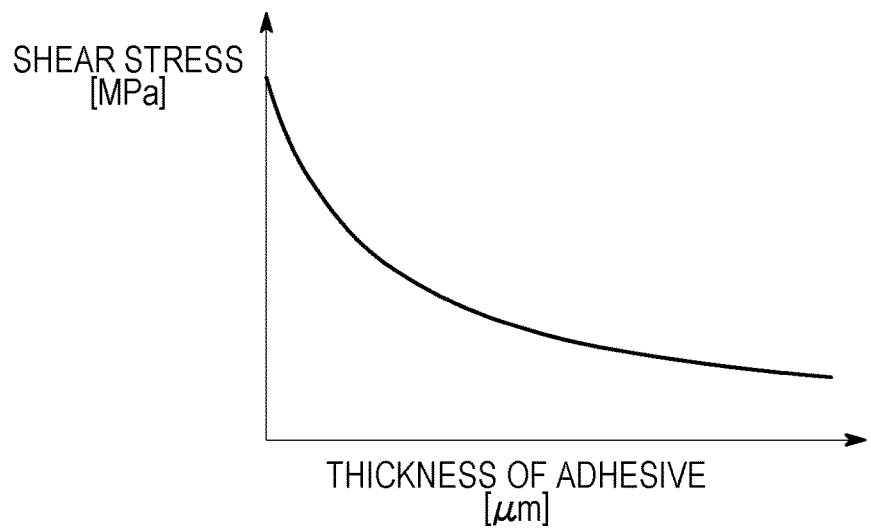
FIG. 8 is a graph representing the relationship between the layer thickness of an adhesive and the shear stress.
Figure 9:
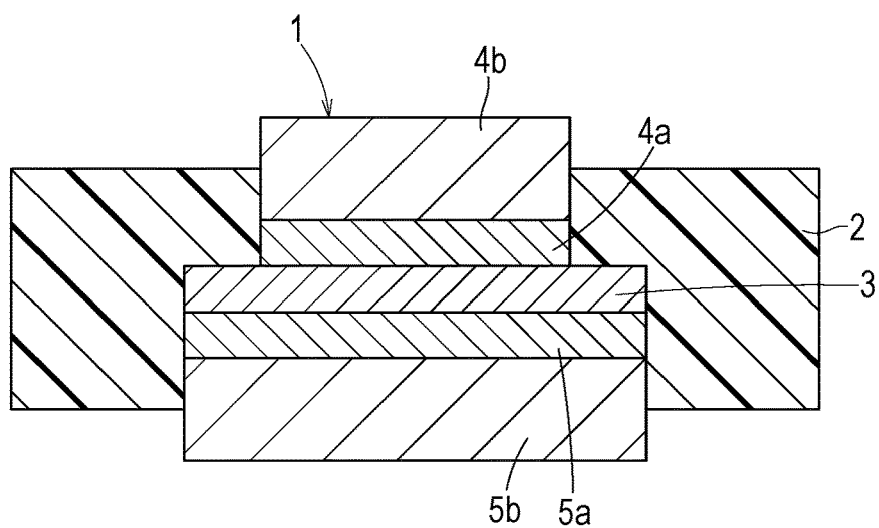
FIG. 9 is a sectional view of an existing membrane electrode assembly.

Therefore, the oxidant gas is sufficiently supplied to the cathode electrode, and therefore it is possible to suppress decrease in the power generation performance due to shortage in the supply of the oxidant gas. Moreover, in the adhesive application portion 62a, which is a joint portion, it is possible to increase the thickness of the inner protruding portion 58a and the layer thickness of the adhesive 62. As illustrated in FIG. 8, by increasing the layer thickness of the adhesive 62, it is possible to appropriately reduce the shear stress acting on a bonded surface and to increase the adhesive strength.

The thickness t3 of the inner protruding portion 58a of the first resin frame member 58 is larger than the thickness t1 of the cathode diffusion layer 56b. Thus, the inner protruding portion 58a first comes into contact with the first metal separator 14, and therefore corner portions at ends of the cathode diffusion layer 56b are not pressed against the solid polymer electrolyte membrane 52. As a result, it is possible to suppress thinning of the solid polymer electrolyte membrane 52 due to deterioration of the solid polymer electrolyte membrane 52. Furthermore, the inner peripheral base portion 58b is allowed have a comparatively large thickness.

Therefore, with the first resin-framed membrane electrode assembly 10a, it is possible to obtain a desirable adhesive strength and resin strength with a compact structure and to suppress the occurrence of deterioration of the membrane due to end portions of the cathode diffusion layer 56b.

Furthermore, the flat surface 54bf of the anode diffusion layer 54b is flush with the flat surface 58f of the first resin frame member 58 near the inner peripheral base portion 58b. Accordingly, it is possible for the first fuel gas channel 34 to have a sufficient channel height that allows a fuel gas to flow smoothly therethrough.

The outer peripheral end portion 56ae of the cathode catalyst layer 56a projects further outward than the outer peripheral end portion 56be of the cathode diffusion layer 56b, and the cathode catalyst layer 56a is disposed in the adhesive application portion 62a and sealed by the adhesive 62. Thus, it is possible to suppress thinning of the solid polymer electrolyte membrane 52 in the outer peripheral end portion 56ae of the cathode catalyst layer 56a.

The second resin-framed membrane electrode assembly 10b provides advantages the same as those of the first resin-framed membrane electrode assembly 10a described above.

In the present embodiment, the fuel cell 12 includes three separators and two resin-framed MEAs, and the coolant channel 32 is formed between two fuel cells 12. However, this is not a limitation. For example, the present embodiment can be applied to a fuel cell including two separators and one resin-framed MEA sandwiched between the separators.

A resin-framed membrane electrode assembly for a fuel cell includes a stepped membrane electrode assembly and a resin frame member surrounding an outer periphery of the membrane electrode assembly.

The membrane electrode assembly includes a solid polymer electrolyte membrane, an anode electrode disposed on one of surfaces of the solid polymer electrolyte membrane, the anode electrode including an anode catalyst layer and an anode diffusion layer, and a cathode electrode disposed on the other surface of the solid polymer electrolyte membrane, the cathode electrode including a cathode catalyst layer and a cathode diffusion layer. The cathode electrode has a size in plan view that is smaller than that of the anode electrode.

The resin frame member surrounds an outer periphery of the solid polymer electrolyte membrane and includes an inner protruding portion that protrudes from an inner peripheral base portion toward the cathode electrode and that has a small thickness. The inner protruding portion is provided with an adhesive application portion formed from an adhesive that is applied so as to surround a part of the inner protruding portion, the part being in contact with the membrane electrode assembly.

In the resin-framed membrane electrode assembly, a thickness of the cathode diffusion layer is larger than a thickness of the anode diffusion layer, and the thickness of the inner protruding portion of the resin frame member is larger than the thickness of the cathode diffusion layer.

Preferably, in the resin-framed membrane electrode assembly, an outer peripheral end portion of the anode diffusion layer is disposed at the inner peripheral base portion of the resin frame member, and a flat surface of the anode diffusion layer is flush with a flat surface of the resin frame member adjacent to the inner peripheral base portion.

Preferably, in the resin-framed membrane electrode assembly, a size of the cathode catalyst layer in plan view is larger than that of the cathode diffusion layer. Preferably, an outer peripheral end portion of the cathode catalyst layer projects further outward than an outer peripheral end portion of the cathode diffusion layer and is disposed in the adhesive application portion.

According to the present disclosure, the size of the cathode electrode in plan view is smaller than that of the anode electrode. The inner protruding portion of the resin frame member includes the adhesive application portion. The adhesive application portion integrally bonds the outer peripheral edge portion of the solid polymer electrolyte membrane corresponding to the outer peripheral edge portion of the anode electrode. The thickness of the anode diffusion layer is smaller than the thickness of the cathode diffusion layer.

Therefore, it is possible to suppress decrease in the power generation performance due to shortage in the supply of the oxidant gas to the cathode and it is possible to provide a joint portion (adhesive application portion) with a larger resin thickness and a larger adhesive thickness. Accordingly, it is possible to appropriately increase the resin strength and the adhesive strength.

Moreover, the thickness of the inner protruding portion of the resin frame member is larger than the thickness of the cathode diffusion layer. Thus, the inner protruding portion first comes into contact with the separator, and therefore corner portions at ends of the cathode diffusion layer are not pressed against the solid polymer electrolyte membrane. As a result, it is possible to suppress thinning of the solid polymer electrolyte membrane due to deterioration of the solid polymer electrolyte membrane.

Therefore, it is possible to obtain a desired adhesive strength and resin strength with a compact structure and to suppress the occurrence of deterioration of the membrane due to end portions of the electrode.

Obviously, numerous modifications and variations of the present invention are possible in light of the above teachings. It is therefore to be understood that within the scope of the appended claims, the invention may be practiced otherwise than as specifically described herein.

What is claimed is:

1. A resin-framed membrane electrode assembly for a fuel cell, comprising:
   a stepped membrane electrode assembly including
      a solid polymer electrolyte membrane,
      an anode electrode disposed on one of surfaces of the solid polymer electrolyte membrane, the anode electrode including an anode catalyst layer and an anode diffusion layer, and
      a cathode electrode disposed on the other surface of the solid polymer electrolyte membrane, the cathode electrode including a cathode catalyst layer and a cathode diffusion layer, the cathode electrode having a size in plan view that is smaller than that of the anode electrode; and
   a resin frame member surrounding an outer periphery of the solid polymer electrolyte membrane and including
      an inner protruding portion that protrudes from an inner peripheral base portion toward the cathode electrode and that has a first thickness, the inner protruding portion having an adhesive application portion in which an adhesive is applied so as to surround a part of the inner protruding portion, the part being in contact with the membrane electrode assembly,
   wherein a thickness of the cathode diffusion layer is larger than a thickness of the anode diffusion layer,
   wherein the first thickness of the inner protruding portion of the resin frame member is:
      larger than the thickness of the cathode diffusion layer, and
      larger than a second thickness of the inner protruding portion at which the adhesive is in direct contact with the inner protruding portion at a location at which the inner protruding portion overlaps the solid polymer electrolyte membrane, and
   wherein the inner protruding portion has an inward-facing end surface forming an inward-most end surface of the resin frame member that is in direct contact with the adhesive.

2. The resin-framed membrane electrode assembly according to claim 1,
   wherein an outer peripheral end portion of the anode diffusion layer is disposed at the inner peripheral base portion of the resin frame member, and a flat surface of the anode diffusion layer is flush with a flat surface of the resin frame member adjacent to the inner peripheral base portion.

3. The resin-framed membrane electrode assembly according to claim 1,
   wherein a size of the cathode catalyst layer in plan view is larger than that of the cathode diffusion layer, and an outer peripheral end portion of the cathode catalyst layer projects further outward than an outer peripheral end portion of the cathode diffusion layer and is disposed in the adhesive application portion.

4. A resin-framed membrane electrode assembly for a fuel cell, comprising:
   a stepped membrane electrode assembly comprising:
      a solid polymer electrolyte membrane having a first surface and a second surface opposite to the first surface;
      an anode electrode disposed on the first surface of the solid polymer electrolyte membrane and including an anode catalyst layer and an anode diffusion layer; and
      a cathode electrode disposed on the second surface of the solid polymer electrolyte membrane and including a cathode catalyst layer and a cathode diffusion layer, the cathode electrode having a size in plan view that is smaller than a size in plan view of the anode electrode;
a resin frame member surrounding an outer periphery of the solid polymer electrolyte membrane and including an inner protruding portion that protrudes from an inner peripheral base portion toward the cathode electrode and that has a first thickness, the inner protruding portion having an adhesive application portion to which an adhesive is applied so as to surround a part of the inner protruding portion, the part being in contact with the stepped membrane electrode assembly;
a thickness of the cathode diffusion layer being larger than a thickness of the anode diffusion layer; and
the first thickness of the inner protruding portion of the resin frame member being:
    larger than the thickness of the cathode diffusion layer, and
    larger than a second thickness of the inner protruding portion at which the adhesive is in direct contact with the inner protruding portion at a location at which the inner protruding portion overlaps the solid polymer electrolyte membrane,
wherein the inner protruding portion has an inward-facing end surface forming an inward-most end surface of the resin frame member that is in direct contact with the adhesive.

5. The resin-framed membrane electrode assembly according to claim 1,
wherein an outer peripheral end portion of the anode diffusion layer is disposed at the inner peripheral base portion of the resin frame member, and a flat surface of the anode diffusion layer is flush with a flat surface of the resin frame member adjacent to the inner peripheral base portion.

6. The resin-framed membrane electrode assembly according to claim 1,
wherein a size of the cathode catalyst layer in plan view is larger than a size of the cathode diffusion layer in plan view, and an outer peripheral end portion of the cathode catalyst layer projects further outward than an outer peripheral end portion of the cathode diffusion layer and is disposed in the adhesive application portion.

7. The resin-framed membrane electrode assembly according to claim 4,
wherein the inner protruding portion includes a surrounding recess that surrounds the part, and
wherein the adhesive application portion is disposed in the surrounding recess.

8. The resin-framed membrane electrode assembly according to claim 7,
wherein the adhesive is applied to only an inner peripheral part of the surrounding recess, and a space is provided in an outer peripheral part of the surrounding recess.

9. The resin-framed membrane electrode assembly according to claim 8,
wherein the part comprises an inner peripheral projection which is located at an inner periphery of the inner protruding portion and an outer peripheral projection which is located at an outer periphery of the inner protruding portion, and
wherein the surrounding recess is provided between the inner peripheral projection and the outer peripheral projection.

10. The resin-framed membrane electrode assembly according to claim 1,
wherein the thickness of the cathode diffusion layer, the thickness of the anode diffusion layer, the first thickness, and the second thickness are measured in a direction along which the one surface of the solid polymer electrolyte membrane is separated from the other surface of the solid polymer electrolyte membrane, and
wherein the inner protruding portion overlaps the solid polymer electrolyte membrane in the direction.

11. The resin-framed membrane electrode assembly according to claim 10,
wherein the first thickness of the inner protruding portion is disposed at an inner peripheral end portion of the inner protruding portion that contacts the membrane electrode assembly.

12. The resin-framed membrane electrode assembly according to claim 11,
wherein the inner protruding portion includes a surrounding recess that surrounds the part, the second thickness being measured at the surrounding recess.

13. The resin-framed membrane electrode assembly according to claim 12,
wherein the surrounding recess at which the second thickness is disposed is outward of the inner peripheral end portion of the inner protruding portion at which the first thickness is disposed.

14. The resin-framed membrane electrode assembly according to claim 4,
wherein the thickness of the cathode diffusion layer, the thickness of the anode diffusion layer, the first thickness, and the second thickness are measured in a direction along which the first surface of the solid polymer electrolyte membrane is separated from the second surface of the solid polymer electrolyte membrane, and
wherein the inner protruding portion overlaps the solid polymer electrolyte membrane in the direction.

15. The resin-framed membrane electrode assembly according to claim 14,
wherein the first thickness of the inner protruding portion is disposed at an inner peripheral end portion of the inner protruding portion that contacts the membrane electrode assembly.

16. The resin-framed membrane electrode assembly according to claim 15,
wherein the inner protruding portion includes a surrounding recess that surrounds the part, the second thickness being formed by the surrounding recess.

17. The resin-framed membrane electrode assembly according to claim 16,
wherein the surrounding recess at which the second thickness is disposed is outward of the inner peripheral end portion of the inner protruding portion at which the first thickness is disposed.

18. The resin-framed membrane electrode assembly according to claim 1,
wherein the first thickness is disposed at a location of the inner protruding portion of the resin frame member that is outward of the adhesive and that is in direct contact with the membrane electrode assembly, and
wherein the first thickness is larger than a third thickness of the inner protruding portion that is located at an inward-most peripheral end of the inner protruding portion.

19. The resin-framed membrane electrode assembly according to claim 4,
- wherein the first thickness is disposed at a location of the inner protruding portion of the resin frame member that is outward of the adhesive and that is in direct contact with the membrane electrode assembly, and
- wherein the first thickness is larger than a third thickness of the inner protruding portion that is located at an inward-most peripheral end of the inner protruding portion.

20. The resin-framed membrane electrode assembly according to claim 18,
- wherein the third thickness is larger than the second thickness.

21. The resin-framed membrane electrode assembly according to claim 19,
- wherein the third thickness is larger than the second thickness.

\* \* \* \* \*